US008312905B2

(12) United States Patent
Steiner et al.

(10) Patent No.: US 8,312,905 B2
(45) Date of Patent: Nov. 20, 2012

(54) PNEUMATIC TIRE

(75) Inventors: Pascal Patrick Steiner, Dickirch (LU); Marc Weydert, Strassen (LU); Christian Jean-Marie Kaes, Schrondweiler (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 83 days.

(21) Appl. No.: 12/889,737

(22) Filed: Sep. 24, 2010

(65) Prior Publication Data

US 2012/0077902 A1    Mar. 29, 2012

(51) Int. Cl.
*B60C 11/00*    (2006.01)
*B60C 1/00*    (2006.01)

(52) U.S. Cl. ............... 152/450; 152/905; 152/209.1; 524/493; 524/495; 524/261; 524/262; 524/502; 524/501

(58) Field of Classification Search ............ 524/493, 524/495, 261, 262, 502, 501; 152/905, 450, 152/209.1
See application file for complete search history.

(56) References Cited

U.S. PATENT DOCUMENTS

| 4,398,582 | A | 8/1983 | Kazuaki et al. | |
| 7,259,205 | B1 * | 8/2007 | Pagliarini et al. | 524/493 |
| 2004/0261927 | A1 * | 12/2004 | Weydert et al. | 152/209.5 |
| 2005/0032965 | A1 | 2/2005 | Valero | |
| 2005/0222317 | A1 | 10/2005 | Yatsuyanagi | |
| 2008/0121324 | A1 * | 5/2008 | Cambon et al. | 152/209.1 |
| 2011/0129401 | A1 * | 6/2011 | Fournier et al. | 423/339 |

FOREIGN PATENT DOCUMENTS

| EP | 0 601 611 | A1 | 6/1994 |
| EP | 1 400 560 | A1 | 3/2004 |
| EP | 1 493 596 | A1 | 1/2005 |
| EP | 1 493 597 | A1 | 1/2005 |
| EP | 1 637 353 | A1 | 3/2006 |
| EP | 1 902 865 | A1 | 3/2008 |
| KR | 2007 003209 | A | 1/2007 |
| KR | 2009 0069556 | A | 7/2009 |
| WO | WO 03/016215 | A1 | 2/2003 |
| WO | WO 2008077948 | | * 3/2008 |

OTHER PUBLICATIONS

European Search Report, completed Feb. 9, 2012.

* cited by examiner

*Primary Examiner* — James J Seidleck
*Assistant Examiner* — Deve E Valdez
(74) *Attorney, Agent, or Firm* — John D. DeLong

(57) ABSTRACT

The invention is directed to a pneumatic tire having a tread comprising a vulcanizable rubber composition comprising, expressed as parts by weight per 100 parts by weight of elastomer (phr), (A) 30 to 70 phr of a first styrene-butadiene rubber,
(B) 20 to 60 phr of a second styrene-butadiene rubber,
(C) 5 to 20 phr of cis-1,4 polybutadiene having a Tg of from $-110°$ C. to $-90°$ C.;
(D) 30 to 60 phr of processing oil;
(E) 5 to 20 phr of carbon black having an Iodine absorption ranging from 130 to 210 g/kg according to ASTM D-1510 and an oil absorption ranging from 110 to 140 cc/100 g according to ASTM D-2414;
(F) 80 to 130 phr of silica;
(G) 0.5 to 20 phr of a sulfur containing organosilicon compound; and
(H) 5 to 20 phr of resin.

20 Claims, No Drawings

PNEUMATIC TIRE

BACKGROUND OF THE INVENTION

It is highly desirable for tires to have good wet skid resistance, low rolling resistance, and good wear characteristics. It has traditionally been very difficult to improve a tire's wear characteristics without sacrificing its wet skid resistance and traction characteristics. These properties depend, to a great extent, on the dynamic viscoelastic properties of the rubbers utilized in making the tire.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads.

SUMMARY OF THE INVENTION

The invention is directed to a pneumatic tire having a tread comprising a vulcanizable rubber composition comprising, expressed as parts by weight per 100 parts by weight of elastomer (phr), (A) 30 to 70 phr of a first styrene-butadiene rubber, wherein the first styrene-butadiene rubber is i) a solution-polymerized styrene-butadiene rubber with a bound styrene content of from 30 to 50 percent by weight, a vinyl 1,2 content of from 10 to 40 percent by weight based on the rubber weight, and a Tg of from about −40° C. to about −20° C.; or ii) an emulsion-polymerized styrene-butadiene rubber with a bound styrene content of from 30 to 50 percent by weight, and a Tg of from about −40° C. to about −20° C.;

(B) 20 to 60 phr of a second styrene-butadiene rubber, wherein the second styrene-butadiene rubber is a solution-polymerized styrene-butadiene rubber with a bound styrene content of from 25 to 45 percent by weight, a vinyl 1,2 content of from 20 to 60 percent by weight based on the rubber weight, and a Tg of from about −30° C. to about −5° C.;

(C) 5 to 20 phr of cis-1,4 polybutadiene having a Tg of from −110° C. to −90° C.;

(D) 30 to 60 phr of processing oil;

(E) 5 to 20 phr of carbon black having an Iodine absorption ranging from 130 to 210 g/kg according to ASTM D-1510 and an oil absorption ranging from 110 to 140 cc/100 g according to ASTM D-2414;

(F) 80 to 130 phr of silica;

(G) 0.5 to 20 phr of a sulfur containing organosilicon compound; and (H) 5 to 20 phr of resin.

DESCRIPTION OF THE INVENTION

The invention is directed to a pneumatic tire having a tread comprising a vulcanizable rubber composition comprising, expressed as parts by weight per 100 parts by weight of elastomer (phr), (A) 30 to 70 phr of a first styrene-butadiene rubber, wherein the first styrene-butadiene rubber is i) a solution-polymerized styrene-butadiene rubber with a bound styrene content of from 30 to 50 percent by weight, a vinyl 1,2 content of from 10 to 40 percent by weight based on the rubber weight, and a Tg of from about −40° C. to about −20° C.; or ii) an emulsion-polymerized styrene-butadiene rubber with a bound styrene content of from 30 to 50 percent by weight, and a Tg of from about −40° C. to about −20° C.;

(B) 20 to 60 phr of a second styrene-butadiene rubber, wherein the second styrene-butadiene rubber is a solution-polymerized styrene-butadiene rubber with a bound styrene content of from 25 to 45 percent by weight, a vinyl 1,2 content of from 20 to 60 percent by weight based on the rubber weight, and a Tg of from about −30° C. to about −5° C.;

(C) 5 to 20 phr of cis-1,4 polybutadiene having a Tg of from −110° C. to −90° C.;

(D) 30 to 60 phr of processing oil;

(E) 5 to 20 phr of carbon black having an Iodine absorption ranging from 130 to 210 g/kg according to ASTM D-1510 and an oil absorption ranging from 110 to 140 cc/100 g according to ASTM D-2414;

(F) 80 to 130 phr of silica;

(G) 0.5 to 20 phr of a sulfur containing organosilicon compound; and (H) 5 to 20 phr of resin.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials, and such terms are well known to those having skill in the rubber mixing or rubber compounding art.

One component of the rubber composition is from 30 to 70 phr of a first styrene-butadiene rubber, wherein the first styrene-butadiene rubber is i) a solution-polymerized styrene-butadiene rubber with a bound styrene content of from 30 to 50 percent by weight, a vinyl 1,2 content of from 10 to 40 percent by weight based on the rubber weight, and a Tg of from about −40° C. to about −20° C.; or ii) an emulsion-polymerized styrene-butadiene rubber with a bound styrene content of from 30 to 50 percent by weight, and a Tg of from about −40° C. to about −20° C.;

As the first styrene-butadiene rubber, suitable solution polymerized styrene-butadiene rubbers may be made, for example, by organo lithium catalyzation in the presence of an organic hydrocarbon solvent. The polymerizations employed in making the rubbery polymers are typically initiated by adding an organolithium initiator to an organic polymerization medium that contains the monomers. Such polymerizations are typically carried out utilizing continuous polymerization techniques. In such continuous polymerizations, monomers and initiator are continuously added to the organic polymerization medium with the rubbery polymer synthesized being continuously withdrawn. Such continuous polymerizations are typically conducted in a multiple reactor system. Suitable polymerization methods are known in the art, for example as disclosed in U.S. Pat. Nos. 4,843,120; 5,137,998; 5,047,483; 5,272,220; 5,239,009; 5,061,765; 5,405,927; 5,654,384; 5,620,939; 5,627,237; 5,677,402; 6,103,842; and 6,559,240.

Alternatively as the first styrene-butadiene rubber, suitable emulsion polymerized styrene-butadiene rubber may be used. By emulsion polymerized styrene-butadiene rubber, it is meant that styrene and 1,3-butadiene are copolymerized as an aqueous emulsion. Such are well known to those skilled in such art.

As the first styrene-butadiene rubber, suitable solution polymerized styrene-butadiene rubbers are available commercially, such as Dow SE-SLR® 6430 and the like. Such solution polymerized styrene-butadiene rubber may be tin- or silicon-coupled, as is known in the art. In one embodiment, suitable SSBR may be at least partially silicon-coupled.

Alternatively as the first styrene-butadiene rubber, suitable emulsion polymerized styrene-butadiene rubbers are available commercially, such as KER®1789 from Synthos Dwory, and the like.

A second component of the rubber composition is from 20 to 60 phr of a second styrene-butadiene rubber, wherein the second styrene-butadiene rubber is solution-polymerized styrene-butadiene rubber (SSBR) with a bound styrene content of from 25 to 45 percent by weight, a vinyl 1,2 content of from 20 to 60 percent by weight based on the rubber weight, and a Tg of from about −30° C. to about −5° C. As the second styrene-butadiene rubber, suitable solution polymerized styrene-butadiene rubbers may be made, for example, by organo lithium catalyzation in the presence of an organic hydrocarbon solvent. The polymerizations employed in making the rubbery polymers are typically initiated by adding an organolithium initiator to an organic polymerization medium that contains the monomers. Such polymerizations are typically carried out utilizing continuous polymerization techniques. In such continuous polymerizations, monomers and initiator are continuously added to the organic polymerization medium with the rubbery polymer synthesized being continuously withdrawn. Such continuous polymerizations are typically conducted in a multiple reactor system. Suitable polymerization methods are known in the art, for example as disclosed in U.S. Pat. Nos. 4,843,120; 5,137,998; 5,047,483; 5,272,220; 5,239,009; 5,061,765; 5,405,927; 5,654,384; 5,620,939; 5,627,237; 5,677,402; 6,103,842; and 6,559,240.

As the second styrene-butadiene rubber, suitable solution polymerized styrene-butadiene rubbers are available commercially, such as Tufdene E680 SSBR from Asahi Chemical, and the like. Such solution polymerized styrene-butadiene rubber may be tin- or silicon-coupled, as is known in the art. In one embodiment, suitable SSBR may be at least partially silicon-coupled.

Another component of the rubber composition is from about 5 to about 20 phr of cis-1,4 polybutadiene, also known as polybutadiene rubber or polybutadiene (BR). Suitable polybutadiene rubbers may be prepared, for example, by organic solution polymerization of 1,3-butadiene. The BR may be conveniently characterized, for example, by having at least a 90 percent cis 1,4-content and a glass transition temperature Tg in a range of from −95 to −105° C. Suitable polybutadiene rubbers are available commercially, such as Budene® 1207 from Goodyear and the like.

A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute.

In one aspect, the use of suitable SSBR, suitable polybutadiene, and 3,4 polyisoprene of the specified composition may result in a rubber composition having at least two elastomer phases.

In this manner, it is considered herein that the relatively low Tg elastomer may be relatively incompatible with the high Tg elastomer as evidenced by their individual Tan delta peaks on a graphical presentation, or plot, of Tan delta versus temperature cured of the rubber composition within a temperature range of about −120° C. to about 10° C. Accordingly, the elastomers of the rubber composition may be present in at least two phases.

In particular, a graphical plot of Tan delta versus temperature curve within a broad range of −100° C. to 10° C. for the rubber composition of this invention may yield two peaks in the curve with one peak having its apex within a relatively low temperature range of −110° C. to −70° C. and a second peak with its apex within a higher temperature range of −35° C. to +10° C.

Thus, one indication of the elastomer incompatibilities is the presence of the dual Tan delta peaks for the sulfur cured elastomer composition. The Tan delta values, with the included peaks in their curves, can be determined by dynamic mechanical testing of the cured compound by procedures well known to those skilled in such art.

Thus, the cured compounded rubber composition may exhibit at least two Tan delta peaks within the aforesaid temperature range. For the cured compounded rubber, it is considered herein that a combination of the Tan delta peak, at the lower temperature (e.g., −100° C. to −50° C.) for the low Tg elastomer (e.g., cis 1,4-polybutadiene), may suggest a promotion of improved resistance to abrasion property (i.e., improved treadwear for a tire) together with the second Tan delta peak, at the higher temperature (e.g., −30° C. to 10° C.) represented by the high Tg elastomer (e.g., the SBR), may suggest a promotion of higher hysteresis at temperatures within a range of about −30° C. to about 0° C. (i.e., higher tire tread traction), all of which is predictive of a better balance of such abrasion resistance and traction properties, particularly for a tire tread, than a cured rubber composition exhibiting only a single Tan delta peak within the aforesaid temperature range of −90° C. to 10° C.

The rubber composition may also include from 30 to 60 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. In one embodiment, the rubber composition includes a low PCA oil. Suitable low PCA oils include but are not limited to mild extraction solvates (MES), treated distillate aromatic extracts (TDAE), residual aromatic extract (RAE), SRAE, and heavy napthenic oils as are known in the art; see for example U.S. Pat. Nos. 5,504,135; 6,103,808; 6,399,697; 6,410,816; 6,248,929; 6,146,520; U.S. Published Applications 2001/00023307; 2002/0000280; 2002/0045697; 2001/0007049; EP0839891; JP2002097369; ES2122917.

Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

Resins may be used in the rubber composition and are generally present in an amount ranging from about 5 to about 20 phr, with a range of from about 10 to about 20 phr being preferred. Suitable resins include alphamethyl styrene resins, coumarone type resins, including coumarone-indene resins and mixtures of coumarone resins, naphthenic oils, phenol resins, and rosins. Other suitable resins include phenol-terpene resins such as phenol-acetylene resins, phenol-formaldehyde resins, terpene-phenol resins, polyterpene resins, and xylene-formaldehyde resins. Further suitable resins include petroleum hydrocarbon resins such as synthetic polyterpene resins; aromatic hydrocarbon resins; resins resulting from the polymerization of styrene and alphamethyl styrene; aliphatic hydrocarbon resins; aliphatic cyclic hydrocarbon resins, such as dicyclopentadiene resins; aliphatic aromatic petroleum resins; hydrogenated hydrocarbon resins; hydrocarbon tackified resins; aliphatic alicyclic petroleum resins; rosin derivatives; and terpene resins. In one embodiment, the resin is selected from hydrocarbon resins synthesized by cationic polymerization of styrene and alphamethyl styrene, and coumarone-indene resins.

The vulcanizable rubber composition may include from about 80 to about 130 phr of a high structure silica.

The rubber composition includes a high structure silica. By high structure, it is meant that the silica has a relatively high specific surface area. Suitable high structure silica may be produced following the methods of U.S. Publication 2005/0032965. The characterization of the high structure silica is reproduced herein from U.S. Publication 2005/0032965, paragraphs [0055] to [0185].

As disclosed in U.S. Publication 2005/0032965, paragraphs [0055] to [0185]:

In the description of the high structure silica that follows, the BET specific surface area is determined using the Brunauer-Emmet-Teller method described in "The Journal of the American Chemical Society," Vol. 60, page 309, February 1938 and corresponding to the International Standard ISO 5794/1 (Appendix D).

The CTAB specific surface area is the external surface area determined according to the NF T 45007 (November 1987) (5.12) standard.

The DOP oil uptake is determined according to the NF T 30-022 (March 1953) standard using dioctyl phthalate.

The pH is measured according to the ISO 787/9 standard (the pH of a 5% suspension in water).

The XDC particle size analysis method, using centrifugal sedimentation, by which, on the one hand, the size distribution widths of high structure silica objects and, on the other hand, the XDC mode illustrating its size of objects were measured, is described below.

Equipment Needed:

BI-XDC (Brookhaven Instrument X Disc Centrifuge) centrifugal sedimentation particle size analyzer sold by Brookhaven Instrument Corporation;

50 ml tall form beaker;

50 ml graduated measuring cylinder; P1 1500 watt Branson ultrasonic probe, with no endpiece, 13 mm in diameter;

deionized water;

ice-filled crystallizer;

magnetic stirrer.

Measurement Conditions:

DOS 1.35 version of the software (supplied by the manufacturer of the particle size analyzer);

fixed mode;

rotation speed;

duration of the analysis: 120 minutes;

density (high structure silica): 2.1;

volume of the suspension to be sampled: 15 ml.

Preparation of the Specimen:

add 3.2 g of high structure silica and 40 ml deionized water to the tall form beaker;

put the beaker containing the suspension in the ice-filled crystallizer;

immerse the ultrasonic probe in the beaker;

disintegrate the suspension for 16 minutes using the 1500 watt Branson probe (used at 60% of maximum power);

after the disintegration, put the beaker on a magnetic stirrer.

Preparation of the Particle Size Analyzer:

turn the apparatus on and leave to heat for 30 minutes;

rinse the disc twice with deionized water;

introduce 15 ml of the specimen to be analyzed into the disc and start the stirring;

enter into the software the above-mentioned measurement conditions;

make the measurements;

When the Measurements have been Taken:

stop the disc rotating;

rinse the disc several times with deionized water;

stop the apparatus.

Results:

In the apparatus register, record the values of the 16 wt %, 50 wt % (or median) and 84 wt % let-through diameters and the value of the mode (the derivative of the cumulative particle size curve gives a frequency curve the abscissa of the maximum of which (abscissa of the main population) is called the mode).

The size distribution width $L_d$ of objects, measured by XDC particle size analysis, after ultrasonic disintegration (in water), corresponds to the (d84–d16)/d50 ratio in which dn is the size for which n % of particles (by weight) have a size smaller than that size (the distribution width $L_d$ is therefore calculated from the cumulative particle size curve taken in its entirety).

The size distribution width $L'_d$ of objects smaller than 500 nm, measured by XDC particle size analysis, after ultrasonic disintegration (in water), corresponds to the (d84–d16)/d50 ratio in which dn is the size for which n % of particles (by weight), with respect to the particles smaller in size than 500 nm, have a size smaller than that size (the distribution width $L'_d$ is therefore calculated from the cumulative particle size curve truncated above 500 nm).

In addition, using this centrifugal sedimentation XDC particle size analysis method, it is possible to measure a weight-average size of the particles (that is to say of the secondary particles or aggregates), denoted $d_w$, after dispersion, by ultrasonic disintegration, of the high structure silica in water. The method differs from that described above by the fact that the suspension formed (high structure silica+deionized water) is disintegrated, on the one hand, for 8 minutes and, on the other hand, using a 1500 watt 1.9 cm VIBRACELL ultrasonic probe (sold by Bioblock) (the probe being used at 60% of maximum power). After analysis (sedimentation for 120 minutes), the weight distribution of particle sizes is calculated by the software of the particle size analyzer. The weight-average geometrical mean of the particle sizes (Xg according to the nomenclature of the software), denoted $d_w$, is calculated by the software from the following equatic $$\mathrm{Log}d_w = \sum_{i=1}^{n} m_i \log d_i \Big/ \sum_{i=1}^{n} m_i$$

$m_i$ being the mass of all of the objects in the class of size $d_i$.

The pore volumes given are measured by mercury porosimetry; each specimen is prepared as follows: each specimen is predried for 2 hours in an oven at 200° C. and then placed in a test container within 5 minutes following its removal from the oven and vacuum-degassed, for example using a rotary vane pump; the pore diameters (AUTOPORE III 9420

Micromeritics porosimeter) are calculated by the Washburn equation with a contact angle θ of 140° and a surface tension γ of 484 dynes/cm (or N/m).

$V_{(d5-d50)}$ represents the pore volume formed by the pores of diameters between d5 and d50 and $V_{(d5-d100)}$ represents the pore volume formed by the pores of diameters between d5 and d100, dn here being the pore diameter for which n % of the total surface area of all the pores is formed by the pores of diameter greater than that diameter (the total surface area of the pores ($S_0$) may be determined from the mercury intrusion curve).

The pore distribution width 1 dp is obtained by the pore distribution curve, as indicated in FIG. 1 of U.S. Publication 2005/0032965, i.e., the pore volume (in ml/g) as a function of the pore diameter (in nm): the coordinates of the point S corresponding to the principal population, namely the values of the diameter $X_S$ (in nm) and the pore volume $Y_S$ (in ml/g), are recorded; a straight line of the equation $Y=Y_S/2$ is plotted; this straight line cuts the pore distribution curve at two points A and B on either side of $X_S$, the abscissae (in nm) of points A and B being $X_A$ and $X_B$, respectively; the pore distribution width pdw is equal to the ratio $(X_A-X_B)/X_S$.

In some cases, the dispersibility (and disintegratability) of the high structure silica according to the invention may be quantified by means of specific disintegration tests.

One of the disintegration tests is carried out according to the following protocol:

The cohesion of the agglomerates is assessed by a particle size measurement (using laser diffraction) carried out on a suspension of high structure silica ultrasonically disintegrated beforehand; in this way, the disintegratability of the high structure silica (the break-up of objects from 0.1 to a few tens of microns) is measured.

The ultrasonic disintegration is carried out using a Bioblock Vibracell sonifier (600-W) fitted with a 19 mm diameter probe. The particle size measurement is carried out by laser diffraction on a SYMPATEC particle size analyzer.

Weighed in a pillbox (height: 6 cm and diameter: 4 cm) are 2 grams of high structure silica to which 50 grams of deionized water are added: an aqueous suspension containing 4% high structure silica, which is homogenized for 2 minutes by magnetic stirring, is thus produced. Next, the ultrasonic disintegration is carried out as follows: with the probe immersed over a length of 4 cm, the output power is adjusted so as to obtain a deflection of the needle of the power dial indicating 20%. The disintegration is carried out for 420 seconds. Next, the particle size measurement is taken after a known volume (expressed in ml) of the homogenized suspension has been introduced into the container of the particle size analyzer.

The value of the median diameter $\lfloor_{50S}$ (or Sympatec median diameter) that is obtained is smaller the higher the disintegratability of the high structure silica. It is also possible to determine the (10× volume of suspension (in ml) introduced)/(optical density of the suspension detected by the particle size analyzer) ratio may also be determined (this optical density is around 20). This ratio is indicative of the content of particles of a size of less than 0.1 μM, which particles are not detected by the particle size analyzer. This ratio is called the ultrasonic Sympatec disintegration factor ($F_{DS}$).

Another disintegration test is carried out according to the following protocol:

The cohesion of the agglomerates is assessed by a particle size measurement (using laser diffraction) carried out on a suspension of high structure silica ultrasonically disintegrated beforehand; in this way, the disintegrability of the high structure silica (break-up of objects from 0.1 to a few tens of microns) is measured. The ultrasonic disintegration is carried out using a Bioblock VIBRACELL sonifier (600 W), used at 80% of maximum power, fitted with a 19 mm diameter probe. The particle size measurement is carried out by laser diffraction on a Malvern Mastersizer 2000 particle size analyzer.

One gram of high structure silica is weighed in a pillbox (height: 6 cm and diameter: 4 cm) and deionized water is added to bring the weight to 50 grams: an aqueous suspension containing 2% high structure silica, which is homogenized for 2 minutes by magnetic stirring, is thus produced. Ultrasonic disintegration is then carried out for 420 seconds. Next, the particle size measurement is taken after all of the homogenized suspension has been introduced into the container of the particle size analyzer.

The value of the median diameter $\lfloor_{50M}$ (or Malvern median diameter) that is obtained is smaller the higher the disintegratability of the high structure silica. It is also possible to determine the (10× blue laser obscuration value)/(red laser obscuration value) ratio. This ratio is indicative of the content of particles smaller in size than 0.1 μM. This ratio is called the Malvern ultrasonic disintegration factor ($F_{DM}$).

A disintegration rate, denoted α, may be measured by means of another ultrasonic disintegration test, at 100% power of a 600 watt probe, operating in pulsed mode (i.e., on for 1 second/off for 1 second) so as to prevent the ultrasonic probe from heating up excessively during the measurement. This known test, forming the subject matter for example of Application WO 99/28376 (see also Applications WO 99/28380, WO 00/73372 and WO 00/73373), allows the variation in the volume-average size of the particle agglomerates to be continuously measured during sonification, according to the indications given below. The set-up used consists of a laser particle size analyzer (of the MASTERSIZER S type sold by Malvern Instruments: He—Ne laser source emitting in the red at a wavelength of 632.8 nm) and of its preparation station (Malvern Small Sample Unit MSX1), between which a continuous flux stream treatment cell (Bioblock M72410) fitted with an ultrasonic probe (600 watt VIBRACELL-type 12.7 mm sonifier sold by Bioblock) was inserted. A small quantity (150 mg) of high structure silica to be analyzed is introduced with 160 ml of water into the preparation station, the rate of circulation being set at its maximum. At least three consecutive measurements are carried out in order to determine, using the known Fraunhofer calculation method (Malvern 3$$D calculation matrix), the initial volume-average diameter of the agglomerates, denoted $d_v[0]$. Sonification (pulsed mode: on for 1 s/off for 1 s) is then applied at 100% power (i.e., 100% of the maximum position of the tip amplitude) and the variation in the volume-average diameter $d_v[t]$ as a function of time t is monitored for about 8 minutes, a measurement being taken approximately every 10 seconds. After an induction period (about 3-4 minutes), it is observed that the inverse of the volume-average diameter $1/d_v[t]$ varies linearly, or substantially linearly, with time t (disintegration steady state). The rate of disintegration .alpha. is calculated by linear regression from the curve of variation of $1/d_v[t]$ as a function of time t in the disintegration steady state region (in general, between 4 and 8 minutes approximately); it is expressed in $\mu m^{-1} min^{-1}$.

The aforementioned Application WO 99/28376 describes in detail a measurement device that can be used for carrying out this ultrasonic disintegration test. This device consists of a closed circuit in which a stream of particle agglomerates in suspension in a liquid can circulate. This device essentially comprises a specimen preparation station, a laser particle size analyzer and a treatment cell. Setting to atmospheric pressure, within the specimen preparation station and the actual treatment cell, makes it possible for the air bubbles that form during sonification (i.e., the action of the ultrasonic probe) to be continuously removed. The specimen preparation station (Malvern Small Sample Unit MSX1) is designed to receive the high structure silica specimen to be tested (in suspension in the liquid) and to make it circulate around the circuit at the preset speed (potentiometer-maximum speed about 3 l/min) in the form of a stream of liquid suspension. This preparation station simply consists of a receiving container which contains the suspension to be analyzed and through which the said suspension flows. It is equipped with a variable-speed stirring motor so as to prevent any sedimentation of the particle agglomerates of the suspension, a centrifuge mini-pump is designed to circulate the suspension in the circuit; the inlet of the preparation station is connected to the open air via an opening intended to receive the charge specimen to be tested and/or the liquid used for the suspension. Connected to the preparation station is a laser particle size analyzer (MASTERSIZER S) whose function is to continuously measure, at regular time intervals, the volume-average size $d_v$ of the agglomerates, as the stream passes, by a measurement cell to which the recording means and the automatic calculation means of the particle size analyzer are coupled. It will be briefly recalled here that laser particle size analyzers make use, in a known manner, of the principle of light diffraction by solid objects in suspension in a medium whose refractive index is different from that of the solid. According to the Fraunhofer theory, there is a relationship between the size of the object and the angle of diffraction of the light (the smaller the object the larger the angle of diffraction). In practice, all that is required is to measure the quantity of diffracted light for various angles of diffraction in order to be able to determine the size distribution (by volume) of the specimen, $d_v$ corresponding to the volume-average size of this distribution $d_v = \Sigma(n_i d_i^4)/\Sigma(n_i d_i^3)$ where $n_i$ is the number of objects of the class of size or diameter $d_i$. Finally, a treatment cell fitted with an ultrasonic probe is inserted between the preparation station and the laser particle size analyzer, the said cell being able to operate in continuous or pulsed mode and intended to continuously break up the particle agglomerates as the stream passes. This stream is thermostatically controlled by means of a cooling circuit placed, within the cell, in a jacket surrounding the probe, the temperature being controlled, for example, by a temperature probe immersed in the liquid within the preparation station.

The Sears number is determined using the method described by G. W. Sears in the article in Analytical Chemistry, Vol. 28, No. 12, December 1956 entitled "Determination of specific surface area of colloidal high structure silica by titration with sodium hydroxide."

The Sears number is the volume of 0.1M sodium hydroxide solution needed to raise the pH of a 10 g/l high structure silica suspension in a 200 g/l sodium chloride medium from 4 to 9.

To do this, 400 grams of sodium chloride are used to prepare a 200 g/l sodium chloride solution acidified to pH 3 with a 1M hydrochloric acid solution. The weighings are performed by means of a Mettler precision balance. 150 ml of this sodium chloride solution are delicately added to a 250 ml beaker into which a mass M (in g) of the specimen to be analyzed, corresponding to 1.5 grams of dry high structure silica, has been introduced beforehand. Ultrasound is applied for 8 minutes to the dispersion obtained (Branson 1500 W ultrasonic probe; 60% amplitude, 13 mm diameter), the beaker being in an ice-filled crystallizer. The solution obtained is then homogenized by magnetic stirring, using a bar magnet having dimensions of 25 mm×5 mm. A check is made that the pH of the suspension is less than 4, if necessary by adjusting it using a 1M hydrochloric acid solution. Next, a 0.1M sodium hydroxide solution is added at a rate of 2 ml/min by means of a Metrohm titrator pH meter (672 Titroprocessor, 655 Dosimat) precalibrated using pH 7 and pH 4 buffer solutions. (The titrator pH meter was programmed as follows: 1) Call up the "Get pH" program—and 2) Introduce the following parameters: pause (wait time before the start of titration): 3 s; reactant flow rate: 2 ml/min; anticipation (adaptation of the titration rate to the slope of the pH curve): 30; stop pH: 9.40; critical EP (sensitivity of detection of the equivalence point): 3; report (parameters for printing the titration report): 2, 3 and 5 (i.e., creation of a detailed report, list of measurement points and titration curve)). The exact volumes $V_1$ and $V_2$ of sodium hydroxide solution added in order to obtain a pH of 4 and a pH of 9, respectively, are determined by interpolation. The Sears number for 1.5 grams of dry high structure silica is equal to $((V_2-V_1) \times 150)/(SC-M)$, where:

$V_1$: volume of 0.1M sodium hydroxide solution at $pH_1=4$;
$V_2$: volume of 0.1M sodium hydroxide solution at $pH_2=9$;
M: mass of the specimen (in g);
SC: solids content (in %).

The pore distribution width may possibly be also illustrated by the parameter W/FI determined by mercury porosimetry. The measurement is carried out using PASCAL 140 and PASCAL 440 porosimeters sold by ThermoFinnigan, operating in the following manner: a quantity of specimen between 50 and 500 mg (in the present case 140 mg) is introduced into a measurement cell. This measurement cell is installed in the measurement unit of the PASCAL-140 apparatus. The specimen is then vacuum-degassed for the time needed to achieve a pressure of 0.01 kPa (typically around 10 minutes). The measurement cell is then filled with mercury. The first part of the mercury intrusion curve Vp=f(P), where Vp is the mercury intrusion volume and P is the applied pressure, for pressures of less than 400 kPa, is determined using the PASCAL 140 porosimeter. The measurement cell is then installed in the measurement unit of the PASCAL 440 porosimeter, the second part of the mercury intrusion curve Vp=f(P) for pressures between 100 kPa and 400 MPa being determined using the PASCAL 440 porosimeter. The porosimeters are used in PASCAL mode so as to permanently adjust the rate of mercury intrusion according to the variations in the intrusion volume. The rate parameter in PASCAL mode is set to 5. The pore radii Rp are calculated from the pressure values P using the Washburn equation, assuming that the pores are cylindrical, choosing a contact angle θ of 140° and a surface tension γ of 480 dynes/cm (or N/m). The pore volumes Vp are relative to the mass of high structure silica introduced and are expressed in $cm^3/g$. The signal Vp=f(Rp) is smoothed by combining a logarithmic filter ("smooth dumping factor" filter parameter F=0.96) and a moving-average filter ("number of points to average" filter parameter f=20). The pore size distribution is obtained by calculating the derivative dVp/dRp of the smooth intrusion curve. The fineness index FI is the pore radius value (expressed in ångströms) corresponding to the maximum of the pore size distribution dVp/dRp. The mid-height width of the pore size distribution dVp/dRp is denoted by W.

The number of silanols per $nm^2$ of surface area is determined by grafting methanol onto the surface of the high structure silica. Firstly, 1 gram of raw high structure silica is put into suspension in 10 ml of methanol, in a 110 ml autoclave (Top Industrie, reference 09990009). A bar magnet is introduced and the autoclave, hermetically sealed and thermally insulated, is heated to 200° C. (40 bar) on a magnetic stirrer, heating for 4 hours. The autoclave is then cooled in a cold water bath. The grafted high structure silica is recovered by settling and the residual methanol is evaporated in a stream of nitrogen. Finally, the grafted high structure silica is vacuum dried for 12 hours at 130° C. The carbon content is determined by an elemental analyzer (NCS 2500 analyzer from CE Instruments) on the raw high structure silica and on the grafted high structure silica. This quantitative determination is carried out on the grafted high structure silica within the three days following the end of drying—this is because the humidity of the air or heat may cause hydrolysis of the methanol grafting. The number of silanols per nm.sup.2 is then calculated using the following formula:

$$N_{SiOH/nm2} = [(\% C_g - \% C_r) \times 6.023 \times 10^{23}]/[S_{BET} \times 10^{18} \times 12 \times 100]$$

where % $C_g$: percent mass of carbon present on the grafted high structure silica;

% $C_r$: percent mass of carbon present on the raw high structure silica;

$S_{BET}$: BET specific surface area of high structure silica (in m²/g).

According to a first variant of the invention, a novel high structure silica will now be proposed which is characterized in that it possesses:

a CTAB specific surface area ($S_{CTAB}$) of between 40 and 525 m²/g;

a BET specific surface area ($S_{BET}$) of between 45 and 550 m²/g;

a size distribution width $L_d$ ((d84−d16)/d50) of objects measured by XDC particle size analysis after ultrasonic disintegration of at least 0.91, in particular at least 0.94, and a pore volume distribution as a function of the size of the pores such that the ratio $V_{(d5-d50)}/V_{(d5-d100)}$ is at least 0.66, in particular at least 0.68.

The high structure silica according to this variant of the invention possesses, for example:

a size distribution width $L_d$ ((d84−d16)/d50) of objects measured by XDC particle size analysis after ultrasonic disintegration of at least 1.04; and a pore volume distribution as a function of the size of the pores such that the ratio $V_{(d5-d50)}/V_{(d5-d100)}$ is at least 0.71.

This high structure silica may have a ratio $V_{(d5-d50)}/V_{(d5-d100)}$ of at least 0.73, in particular at least 0.74. This ratio may be at least 0.78, especially at least 0.80 or even at least 0.84.

A second variant of the invention consists of a novel high structure silica characterized in that it possesses:

a CTAB specific surface area ($S_{CTAB}$) of between 40 and 525 m²/g;

a BET specific surface area ($S_{BET}$) of between 45 and 550 m²/g; and a pore distribution width 1 dp of greater than 0.70, in particular greater than 0.80, especially greater than 0.85.

This high structure silica may have a pore distribution width 1 dp of greater than 1.05, for example greater than 1.25 or even greater than 1.40.

The high structure silica according to this variant of the invention preferably possesses a size distribution width $L_d$ ((d84−d16)/d50) of objects measured by XDC particle size analysis after ultrasonic disintegration, of at least 0.91, in particular at least 0.94, for example at least 1.0.

Also proposed, according to a third variant of the invention, is a novel high structure silica characterized in that it possesses:

a CTAB specific surface area ($S_{CTAB}$) of between 40 and 525 m²/g;

a BET specific surface area ($S_{BET}$) of between 45 and 550 m²/g;

a size distribution width $L'_d$ ((d84−d16)/d50) of objects smaller than 500 nm, measured by XDC particle size analysis after ultrasonic disintegration, of at least 0.95; and a pore volume distribution as a function of the size of the pores such that the ratio $V_{(d5-d50)}/V_{(d5-d100)}$ is at least 0.71.

This high structure silica may have a ratio $V_{(d5-d50)}/V_{(d5-d100)}$ of at least 0.73, in particular at least 0.74. This ratio may be at least 0.78, especially at least 0.80 or even at least 0.84.

A fourth variant of the invention consists of a novel high structure silica characterized in that it possesses:

a CTAB specific surface area ($S_{CTAB}$) of between 40 and 525 m²/g;

a BET specific surface area ($S_{BET}$) of between 45 and 550 m²/g;

a size distribution width $L_d$ ((d84−d16)/d50) of objects smaller than 500 nm, measured by XDC particle size analysis after ultrasonic disintegration, of at least 0.90, in particular at least 0.92; and a pore volume distribution as a function of the size of the pores such that the ratio $V_{(d5-d50)}/V_{(d5-d100)}$ is at least 0.74.

This high structure silica may have a ratio $V_{(d5-d50)}/V_{(d5-d100)}$ of at least 0.78, especially at least 0.80 or even at least 0.84.

In the high structure silica according to the invention (that is to say those in accordance with one of the four variants of the invention), the pore volume provided by the coarsest pores usually represents the largest proportion of the structure.

The high structure silica may have both an object size distribution width $L_d$ of at least one 1.04 and an object size (smaller than 500 nm) distribution width $L'_d$ of at least 0.95.

The size distribution width $L_d$ of objects of the high structure silica according to the invention may in certain cases be at least 1.10, in particular at least 1.20; it may be at least 1.30, for example at least 1.50 or even at least 1.60.

Likewise, the object size (smaller than 500 nm) distribution $L'_d$ of the high structure silica according to the invention may be, for example, at least 1.0, in particular at least 1.10 and especially at least 1.20.

Preferably, the high structure silica according to the invention possess a particular surface chemistry such that they have a (Sears number×1000)/(BET specific surface area ($S_{BET}$)) ratio of less than 60, preferably less than 55, for example less than 50.

The high structure silica according to the invention generally have a high, and therefore a typical object size which may be such that the mode of their particle size distribution measured by XDC particle size analysis after ultrasonic disintegration (in water) satisfies the condition: XDC mode (nm)≧(5320/$S_{CTAB}$ (m²/g))+8, or even the condition: XDC mode (in nm)≧(5320/$S_{CTAB}$ (m²/g))+10.

The high structure silica according to the invention may possess, for example, a pore volume ($V_{80}$) formed by the pores having diameters between 3.7 and 80 nm of at least 1.35 cm³/g, in particular at least 1.40 cm³/g or even at least 1.50 cm³/g.

The high structure silica according to the invention preferably have a satisfactory dispersibility in polymers.

Their median diameter ($\emptyset_{50S}$), after ultrasonic disintegration, is in general less than 8.5 μM; it may be less than 6.0 μM, for example less than 5.5 μM.

Likewise, their median diameter ($\emptyset_{50M}$), after ultrasonic disintegration, is in general less than 8.5 μM, it may be less than 6.0 μM, for example less than 5.5 μM.

They may also possess a rate of disintegration, denoted by α, measured in the test referred to previously as ultrasonic disintegration in pulsed mode, at 100% power of a 600 watt probe, of at least 0.0035 μm$^{-1}$min$^{-1}$, in particular at least 0.0037 μm$^{-1}$min$^{-1}$.

The high structure silica according to the invention may have an ultrasonic disintegration factor ($F_{DS}$) of greater than 3 ml, in particular greater than 3.5 ml, especially greater than 4.5 ml.

Their ultrasonic disintegration factor ($F_{DM}$) may be greater than 6, in particular greater than 7, especially greater than 11.

The high structure silica according to the present invention may have a weight-average particle size, measured by XDC particle size analysis after ultrasonic disintegration, $d_w$, of between 20 and 300 nm, especially between 30 and 300 nm, for example between 40 and 160 nm.

In general, the high structure silica according to the present invention also have at least one, or even all, of the following three characteristics:

a particle size distribution such that $d_w \geq (16{,}500/S_{CTAB}) - 30$;

a porosity such that $W/FI \geq -0.0025\ S_{CTAB} + 0.85$; and a number of silanols per unit area, $N_{SiOH/nm2}$, such that $N_{SiOH/nm2} \leq -0.027\ S_{CTAB} + 10.5$.

According to one embodiment, the high structure silica according to the invention generally have:

a CTAB specific surface area ($S_{CTAB}$) of between 60 and 330 m$^2$/g, in particular between 80 and 290 m$^2$/g;

a BET specific surface area ($S_{BET}$) of between 70 and 350 m$^2$/g, in particular between 90 and 320 m$^2$/g.

Their CTAB specific surface area may be between 90 and 230 m$^2$/g, especially between 95 and 200 m$^2$/g, for example between 120 and 190 m$^2$/g.

Likewise, their BET specific surface area may be between 110 and 270 m$^2$/g, especially between 115 and 250 m$^2$/g, for example between 135 and 235 m$^2$/g.

According to another embodiment, the high structure silica according to the invention generally have:

a CTAB specific surface area of between 40 and 380 m$^2$/g, in particular between 45 and 280 m$^2$/g; and a BET specific surface area of between 45 and 400 m$^2$/g, in particular between 50 and 300 m$^2$/g.

Their CTAB specific surface area may be between 115 and 260 m$^2$/g, especially between 145 and 260 m$^2$/g.

Likewise, their BET specific surface area may be between 120 and 280 m$^2$/g, especially between 150 and 280 m$^2$/g, and more especially between 200 and 260 m$^2$/g.

The high structure silica according to the present invention may have a certain microporosity; thus, the high structure silica according to the invention usually are such that ($S_{BET} - S_{CTAB}) \geq 5$ m$^2$/g, in particular $\geq 15$ m$^2$/g, for example $\geq 25$ m$^2$/g.

This microporosity is not in general too great: the high structure silica according to the invention are generally such that ($S_{BET} - S_{CTAB}$) < 50 m$^2$/g, preferably < 40 m$^2$/g.

The pH of the high structure silica according to the invention is usually between 6.3 and 7.8, especially between 6.6 and 7.5.

They possess a DOP oil uptake that varies, usually, between 220 and 330 ml/100 g, for example between 240 and 300 ml/100 g.

They may be in the form of approximately spherical beads with a mean size of at least 80 μM.

This mean size of the beads may be at least 100 μM, for example at least 150 μM; it is in general at most 300 μM and preferably lies between 100 and 270 μM. This mean size is determined according to the NF X 11507 (December 1970) standard by dry screening and determination of the diameter corresponding to a cumulative oversize of 50%.

The high structure silica according to the invention may also be in the form of powder having a mean size of at least 15 μM; for example, it is between 15 and 60 μM (especially between 20 and 45 μm) or between 30 and 150 μM (especially between 45 and 120 μM).

They may also be in the form of granules having a size of at least 1 mm, in particular between 1 and 10 mm, along the axis of their largest dimension (length).

The high structure silica according to the invention are preferably prepared by the preparation process according to the invention and described above.

Suitable carbon blacks can be used in a range from 5 to 20 phr. Representative examples of such carbon blacks include N110, N121, N134, N220, N231, N234, N242, N293, N299, 5315, N326, N330, M332, N339, N343, N347, N351, N358, N375, N539, N550, N582, N630, N642, N650, N683, N754, N762, N765, N774, N787, N907, N908, N990 and N991. Suitable carbon blacks have iodine absorptions ranging from 9 to 220 g/kg and DBP oil absorption number ranging from 34 to 150 cm$^3$/100 g. In one embodiment, the carbon black has an iodine absorption ranging from 130 to 210 g/kg according to ASTM-D1510 and a DBP oil absorption number ranging from 110 to 140 cc/100 g according to ASTM D-2414.

The vulcanizable rubber composition may include from 1 to 20 phr of crosslinked particulate polymer gel, ultra high molecular weight polyethylene (UHMWPE) or plasticized starch.

Other fillers may be used in the rubber composition including, but not limited to, particulate fillers including ultra high molecular weight polyethylene (UHMWPE), particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639.

In one embodiment the rubber composition for use in the tire tread may contain a conventional sulfur containing organosilicon compound. Examples of suitable sulfur containing organosilicon compounds are of the formula:

$$Z\text{-Alk-}S_n\text{-Alk-}Z \qquad \qquad \text{I}$$

in which Z is selected from the group consisting of $$-\underset{\underset{R^2}{|}}{\overset{\overset{R^1}{|}}{Si}}-R^1 \quad , \quad -\underset{\underset{R^2}{|}}{\overset{\overset{R^1}{|}}{Si}}-R^2 \quad \text{and} \quad -\underset{\underset{R^2}{|}}{\overset{\overset{R^2}{|}}{Si}}-R^2$$

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl)disulfide, 3,3'-bis(triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"- ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxysilylpropyl), 2,2'-bis(tri-2"-methylcyclohexoxysilylethyl)tetrasulfide, bis(trimethoxysilylmethyl)tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl), 3,3'-bis(diphenyl isopropoxysilylpropyl)tetrasulfide, 3,3'-bis(diphenyl cyclohexoxysilylpropyl)disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl), 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyldodecyl), 18,18'-bis(trimethoxysilyloctadecyl), 18,18'-bis(tripropoxysilyloctadecenyl)tetrasulfide, 4,4'-bis(trimethoxysilylbuten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl).

In one embodiment, the sulfur containing organosilicon compounds are the 3,3'-bis(trimethoxy or triethoxy silylpropyl)sulfides. In one embodiment, the sulfur containing organosilicon compounds are 3,3'-bis(triethoxysilylpropyl)disulfide and 3,3'-bis(triethoxysilylpropyl)tetrasulfide. Therefore, as to formula I, Z may be

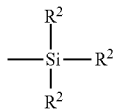

where $R^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. As disclosed in U.S. Pat. No. 6,608,125, these sulfur containing organosilicon compounds are of the formula G-C(=O)—S—$CH_2CH_2CH_2SiX_3$ wherein each X is an independently selected RO— group wherein each R is independently selected from the group consisting of hydrogen, alkyl that may or may not contain unsaturation, alkenyl groups, aryl groups, and aralkyl groups, such moieties other than hydrogen having from 1 to 18 carbon atoms, and G is a monovalent alkyl of from 6 to 8 carbon atoms. In one embodiment, the sulfur containing organosilicon compounds includes 3-(octanoylthio)-1-propyltriethoxysilane, $CH_3(CH_2)_6C(=O)$—S—$CH_2CH_2CH_2Si(OCH_2CH_3)_3$, which is available commercially as NXT™ from GE Silicones.

In another embodiment, suitable sulfur containing organosilicon compounds include those disclosed in U.S. Patent Publication 2003/0130535. As disclosed in U.S. Patent Publication 2003/0130535, these sulfur containing organosilicon compounds are of the formulas II or III

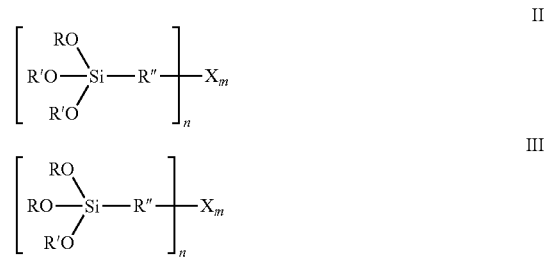

wherein: R is a methyl or ethyl group;

R' is identical or different and is a $C_9C_{30}$ branched or unbranched monovalent alkyl or alkenyl group, aryl group, aralkyl group, branched or unbranched $C_2$-$C_{30}$ alkyl ether group, branched or unbranched $C_2$-$C_{30}$ alkyl polyether group or $R'''_3Si$, where R''' is $C_1$-$C_{30}$ branched or unbranched alkyl or alkenyl group, aralkyl group or aryl group, R" is a branched or unbranched, saturated or unsaturated, aliphatic, aromatic or mixed aliphatic/aromatic divalent $C_1$-$C_{30}$ hydrocarbon group;

X is SH where n=1 and m=1, S where n=2 and m=1-10 and mixtures thereof, S(C=O)—R''' where n=1 and m=1 or H where n=1 and m=1;

R" may mean $CH_2$, $CH_2CH_2$, $CH_2CH_2CH_2$, $CH_2CH_2CH_2CH_2$, $CH(CH_3)$, $CH_2CH(CH_3)$, $C(CH_3)_2$, $CH(C_2H_5)$, $CH_2CH_2CH(CH_3)$, $CH_2CH(CH_3)CH_2$ or

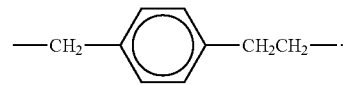

In one embodiment, the sulfur containing organosilicon compound is of formula II, R is ethyl, R' is $C_{12}$-$C_{14}$ alkyl, R" is $CH_2CH_2CH_2$, X is SH, n is 1 and m is 1. In one embodiment, the sulfur containing organosilicon compound is Si-363 from Degussa.

In one embodiment, the sulfur containing organosilicon compound is a combination of 3,3'-bis(triethoxypropylsilyl) and 3-(octanoylthio)-1-propyltriethoxysilane The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the compound is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purposes of illustrating and not limiting the present invention. All parts are parts by weight unless specifically identified otherwise.

EXAMPLE 1

In this example, two rubber compounds are compared. Sample 1 represents a control sample. Sample 2 is representative of the present invention.

The elastomers were compounded in a multi-stage mix procedure with standard amounts of conventional curatives and processing aids as indicated in Table 1 (all amounts in phr), and cured with a standard cure cycle. Cured samples were evaluated for various physical properties following standard tests protocols as indicated in Table 2. Tires having tread made from compounds of samples 1 and 2 were tested for various performance criteria as shown in Table 3 (values normalized to the control=100)

TABLE 1

Compound Recipes

| Sample | 1 control | 2 inventive |
|---|---|---|
| Emulsion SBR [1] | 50 | 50 |
| Solution SBR [2] | 40 | 40 |
| Polybutadiene [3] | 10 | 10 |
| Oil [4] | 34 | 37 |
| Silica [5] | 110 | — |
| Silica [6] | — | 110 |
| Carbon black [7] | 5 | 5 |
| Resins [8] | 16 | 16 |
| Coupling agent [9] | 7.9 | 9.7 |
| Coupling agent [10] | 2 | 2 |
| Waxes [11] | 1.5 | 1.5 |
| Stearic acid | 2.5 | 2.5 |
| Antidegradant [12] | 3 | 3 |
| Zinc oxide | 2.5 | 2.5 |
| Sulfur | 1.6 | 1.6 |
| Accelerators [13] | 4.4 | 4.4 |

[1] KER1789 ESBR, 40% styrene, Tg(OE) = −33° C., 37.5 phr RAE oil, from Synthos Dwory
[2] TUFDENE E680 SSBR, 34% styrene, 38% vinyl, Tg(OE) = −25° C., 37.5 phr SRAE oil, from Asahi Chemical
[3] Budene1207 from Goodyear Tire & Rubber Chemical
[4] RAE, SRAE & TDAE oil
[5] Precipitated Silica, BET Nitrogen Surface Area = 160 m2/g
[6] Precipitated Silica, BET Nitrogen Surface Area = 210 m2/g, Width of pore size distribution by Hg porosimetry = 1.1
[7] Furnace black with iodine absorption number = 202 g/kg (ASTM D-1510), oil absorption number = 134 cc/kg (ASTM D-2414)
[8] Alphamethyl styrene resin and Coumarone-indene resin
[9] Bis(triethoxysilylpropyl) disulfide
[10] 50% Bis(triethoxysilylpropyl) tetrasulfide on carbon black
[11] Microcrystalline & paraffinic waxes
[12] p-phenylenediamine type
[13] Sulfenamide and guanidine type

TABLE 2

| Sample | 1 | 2 |
|---|---|---|
| Shore A | 69 | 72 |
| Rebound 0° C. | 6.7 | 7.8 |
| Rebound 23° C. | 13 | 16 |
| Rebound 100° C. | 44 | 42 |
| Elongation, % | 578 | 625 |
| True Tensile, MPa | 102 | 109 |
| Modulus @ 300% | 7.5 | 6.6 |
| Tensile strength, MPa | 15.1 | 15 |

TABLE 3

| Sample | 1 | 2 |
|---|---|---|
| WET BRAKING | 100 | 99 |
| DRY BRAKING | 100 | 100 |
| ROLLING RESISTANCE | 100 | 107 |
| TREADWEAR | 100 | 101 |

As can be seen from Table 3, the tire having the tread using a compound according to the present invention shows improved rolling resistance, with no compromise in wet and dry braking and treadwear performance as compared with the control.

EXAMPLE 2

In this example, five rubber compounds are compared. Sample 3 represents a control sample. Samples 5 and 7 are representative of the present invention, and samples 4 and 6 are comparative.

The elastomers were compounded in a multi-stage mix procedure with standard amounts of conventional curatives and processing aids as indicated in Table 4 (all amounts in phr), and cured with a standard cure cycle. Cured samples were evaluated for various physical properties following standard tests protocols as indicated in Table 5. Tires having tread made from compounds of samples 3 to 7 were tested for various performance criteria as shown in Table 6 (values normalized to the control=100)

TABLE 4

| Sample | 3 control | 4 inventive | 5 inventive | 6 inventive | 7 inventive |
|---|---|---|---|---|---|
| Emulsion SBR [1] | — | 50 | — | 50 | — |
| Solution SBR [2] | — | — | 50 | — | 50 |
| Solution SBR [3] | — | 40 | 40 | 40 | 40 |
| Solution SBR [4] | 75 | — | — | — | — |
| Polybutadiene [5] | 10 | 10 | 10 | 10 | 10 |
| 3,4 Polyisoprene [6] | 15 | — | — | — | — |
| Oil [7] | 31 | 34 | 34 | 34 | 40 |
| Silica [8] | 95 | 110 | 110 | — | — |
| Silica [9] | — | — | — | 100 | 100 |
| Carbon black [10] | 20 | 5 | 5 | 5 | — |
| Carbon black [11] | — | — | — | — | 5 |
| Resins [12] | 16 | 16 | 16 | 16 | 10 |
| Coupling agent [13] | 6 | — | — | — | — |
| Coupling agent [14] | — | 7.9 | 7.9 | 9 | 9 |
| Coupling agent [15] | 2 | 2 | 2 | 2 | 2 |
| Waxes [16] | 1.5 | 1.5 | 1.5 | 1.5 | 1.5 |
| Stearic acid | 2.5 | 2.5 | 2.5 | 2.5 | 2.5 |
| Antidegradant [17] | 3 | 3 | 3 | 3 | 3 |
| Zinc oxide | 2.5 | 2.5 | 2.5 | 2.5 | 2.5 |
| Sulfur | 1.8 | 1.6 | 1.6 | 1.6 | 1.6 |
| Accelerators [18] | 4.5 | 5.1 | 5.1 | 5.4 | 5.4 |

[1] KER1789 ESBR, 40% styrene, Tg (OE) = −33° C., 37.5 phr RAE oil, from Synthos Dwory
[2] SE SLR6430 SSBR, 40% styrene, 14% vinyl, Tg (OE) = −34° C., 37.5 phr TDAE oil, from Dow Schkopau
[3] TUFDENE E680 SSBR, 34% styrene, 38% vinyl, Tg(OE) = −25° C., 37.5 phr SRAE oil, from Asahi Chemical
[4] SE SLR4630 SSBR, 25% styrene, 47% vinyl, Tg(OE) = −26° C., 37.5 phr TDAE oil, from Dow Schkopau
[5] Budene1207 from Goodyear Tire & Rubber Chemical
[6] Vestogrip 6001, 3.4 Polyisoprene, Tg = −11° C., from Karbochem
[7] RAE, SRAE & TDAE oil
[8] Precipitated Silica, BET Nitrogene Surface Area = 160 m2/g
[9] Precipitated Silica, BET Nitrogene Surface Area = 210 m2/g, Width of pore size distribution by Hg porosimetry = 1.1
[10] Furnace black with iodine absorption number = 202 g/kg (ASTM D-1510), oil absorption number = 134 cc/kg (ASTM D-2414)
[11] Furnace black with iodine absorption number = 142 g/kg (ASTM D-1510), oil absorption number = 127 cc/kg (ASTM D-2414)
[12] Alphamethyl styrene resin and Coumarone-indene resin
[13] 3-(octanoylthio)-1-propyltriethoxysilane
[14] Bis(triethoxysilylpropyl) disulfide
[15] 50% Bis(triethoxysilylpropyl) tetrasulfide on carbon black
[16] Microcrystalline & paraffinic waxes
[17] p-phenylenediamine type
[18] Sulfenamide and guanidine type

TABLE 5

| Sample | 3 | 4 | 5 | 6 | 7 |
|---|---|---|---|---|---|
| Shore A | 70 | 75 | 70 | 71 | 70 |
| Rebound 0° C. | 7.7 | 9.3 | 7.8 | 7.7 | 7.8 |
| Rebound 23° C. | 17 | 14 | 17 | 15 | 21 |
| Rebound 100° C. | 46 | 44 | 49 | 50 | 52 |
| Elongation, % | 431 | 539 | 489 | 555 | 536 |
| True Tensile, MPa | 72 | 102 | 96 | 104 | 107 |
| Modulus @ 300% | 10 | 9.3 | 10 | 8 | 8.8 |
| Tensile strength, MPa | 13.5 | 16 | 16.3 | 15.8 | 16.8 |

TABLE 6

| Sample | 3 | 4 | 5 | 6 | 7 |
|---|---|---|---|---|---|
| WET BRAKING | 100 | 106 | 106 | 106 | 105 |
| DRY BRAKING | 100 | 102 | 102 | 101 | 103 |
| ROLLING RESISTANCE | 100 | 93 | 100 | 99 | 105 |
| TREADWEAR | 100 | 105 | 102 | 109 | 108 |

As can be seen from Table 7, the tire having the tread using a compound according to the present invention shows improved rolling resistance, wet and dry braking and treadwear performance as compared with the control.

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic tire having a tread comprising a vulcanizable rubber composition comprising, expressed as parts by weight per 100 parts by weight of elastomer (phr),
    100 phr of elastomer consisting of elastomers (A), (B) and (C):
    (A) 30 to 70 phr of a first styrene-butadiene rubber, wherein the first styrene-butadiene rubber is i) a solution-polymerized styrene-butadiene rubber with a bound styrene content of from 30 to 50 percent by weight, a vinyl 1,2 content of from 10 to 40 percent by weight based on the rubber weight, and a Tg of from about −40° C. to about −20° C.; or ii) an emulsion-polymerized styrene-butadiene rubber with a bound styrene content of from 30 to 50 percent by weight, and a Tg of from about −40° C. to about −20° C.;

(B) 20 to 60 phr of a second styrene-butadiene rubber, wherein the second styrene-butadiene rubber is a solution-polymerized styrene-butadiene rubber with a bound styrene content of from 25 to 45 percent by weight, a vinyl 1,2 content of from 20 to 60 percent by weight based on the rubber weight, and a Tg of from about −30° C. to about −5° C.;

(C) 5 to 20 phr of cis-1,4 polybutadiene having a Tg of from −110° C. to −90° C.;

(D) 30 to 60 phr of a low PCA process oil having a polycyclic aromatic content of less than 3 percent by weight as determined by the IP346 method;

(E) 5 to 20 phr of carbon black having an Iodine absorption ranging from 130 to 210 g/kg according to ASTM D-1510 and an oil absorption ranging from 110 to 140 cc/100 g according to ASTM D-2414;

(F) 80 to 130 phr of silica having a CTAB specific surface area ($S_{CTAB}$) of between 40 and 525 m$^2$/g, a BET specific surface area ($S_{BET}$) of between 45 and 550 m$^2$/g;

(G) 0.5 to 20 phr of sulfur containing organosilicon compound; and (H) 5 to 20 phr of resin comprising alphamethyl styrene resin and coumarone-indene resin.

2. A pneumatic tire having a tread comprising a vulcanizable rubber composition comprising, expressed as parts by weight per 100 parts by weight of elastomer (phr),
100 phr of elastomer consisting of elastomers (A), (B) and C:

(A) 30 to 70 phr of solution-polymerized styrene-butadiene rubber with a bound styrene content of from 30 to 50 percent by weight, a vinyl 1,2 content of from 10 to 40 percent by weight based on the rubber weight, and a Tg of from about −40° C. to about −20° C.;

(B) 20 to 60 phr of solution-polymerized styrene-butadiene rubber with a bound styrene content of from 25 to 45 percent by weight, a vinyl 1,2 content of from 20 to 60 percent by weight based on the rubber weight, and a Tg of from about −30° C. to about −5° C.;

(C) 5 to 20 phr of cis-1,4 polybutadiene having a Tg of from −110° C. to −90° C.;

(D) 30 to 60 phr of processing oil;

(E) 5 to 20 phr of carbon black having an Iodine absorption ranging from 130 to 210 g/kg according to ASTM D-1510 and an oil absorption ranging from 110 to 140 cc/100 g according to ASTM D-2414;

(F) 80 to 130 phr of silica;

(G) 0.5 to 20 phr of a sulfur containing organosilicon compound; and (H) 5 to 20 phr of resin.

3. The pneumatic tire of claim 2, wherein the silica has a BET specific surface area ($S_{BET}$) between 120 and 280 m$^2$/g.

4. The pneumatic tire of claim 2, wherein the silica has a BET specific surface area ($S_{BET}$) between 150 and 280 m$^2$/g.

5. The pneumatic tire of claim 1, wherein the silica has a BET specific surface area ($S_{BET}$) between 200 and 260 m$^2$/g.

6. The pneumatic tire of claim 2, wherein said silica has a CTAB specific surface area ($S_{CTAB}$) of between 40 and 525 m$^2$/g, and a BET specific surface area ($S_{BET}$) of between 45 and 550 m$^2$/g.

7. The pneumatic tire of claim 2, wherein said process oil comprises a low PCA process oil having a polycyclic aromatic content of less than 3 percent by weight as determined by the IP346 method, said low PCA oil selected from mild extraction solvates (MES), treated distillate aromatic extracts (TDAE), or heavy napthenic oils.

8. The pneumatic tire of claim 2, wherein said low PCA oil comprises a mild extraction solvates (MES).

9. The pneumatic tire of claim 2, wherein said low PCA oil comprises treated distillate aromatic extracts (TDAE).

10. The pneumatic tire of claim 2, wherein said sulfur containing organosilicon compound comprises a compound of the formula:

Z-Alk-S$_n$-Alk-Z      I in which Z is selected from the group consisting of

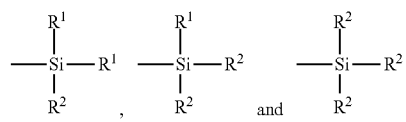

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

11. The pneumatic tire of claim 10, wherein said sulfur containing organosilicon compound comprises at least one of 3,3'-bis(triethoxysilylpropyl)disulfide or 3,3'-bis(triethoxysilylpropyl)tetrasulfide.

12. The pneumatic tire of claim 2, wherein said sulfur containing organosilicon compound comprises a compound of the formula G-C(=O)—S—CH$_2$CH$_2$CH$_2$SiX$_3$ wherein each X is an independently selected RO— group wherein each R is independently selected from the group consisting of hydrogen, alkyl that may or may not contain unsaturation, alkenyl groups, aryl groups, and aralkyl groups, such moieties other than hydrogen having from 1 to 18 carbon atoms, and G is a monovalent alkyl of from 6 to 8 carbon atoms.

13. The pneumatic tire of claim 12, wherein said sulfur containing organosilicon compound comprises 3-(octanoylthio)-1-propyltriethoxysilane.

14. The pneumatic tire of claim 2, wherein said resin comprises alphamethyl styrene resin and coumarone-indene resin.

15. The pneumatic tire of claim 2, wherein said sulfur containing organosilicon compound comprises at least one compound of formula II or III

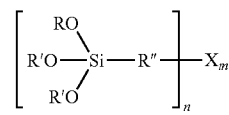     II

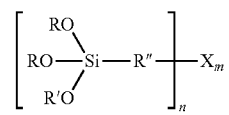     III wherein: R is a methyl or ethyl group;
R' is identical or different and is a C$_9$-C$_{30}$ branched or unbranched monovalent alkyl or alkenyl group, aryl group, aralkyl group, branched or unbranched C$_2$-C$_{30}$ alkyl ether group, branched or unbranched C$_2$-C$_{30}$ alkyl polyether group or R'''$_3$Si, where R''' is C$_1$-C$_{30}$ branched or unbranched alkyl or alkenyl group, aralkyl group or aryl group, R" is a branched or unbranched, saturated or unsaturated, aliphatic, aromatic or mixed aliphatic/aromatic divalent $C_1$-$C_{30}$ hydrocarbon group;

X is SH where n=1 and m=1, S where n=2 and m=1-10 and mixtures thereof, S(C=O)—R''' where n=1 and m=1 or H where n=1 and m=1;

R'' may mean $CH_2$, $CH_2CH_2$, $CH_2CH_2CH_2$, $CH_2CH_2CH_2CH_2$, $CH(CH_3)$, $CH_2CH(CH_3)$, $C(CH_3)_2$, $CH(C_2H_5)$, $CH_2CH_2CH(CH_3)$, $CH_2CH(CH_3)CH_2$ or

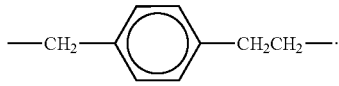

16. The pneumatic tire of claim 15, wherein said sulfur containing organosilicon compound comprise a compound of formula II wherein R is ethyl, R' is $C_{12}$-$C_{14}$ alkyl, R'' is $CH_2CH_2CH_2$, X is SH, n is 1 and m is 1.

17. The pneumatic tire of claim 1, wherein the silica has a size distribution width $L_d$ ((d84−d16)/d50) of objects measured by XDC particle size analysis after ultrasonic disintegration of at least 0.91, and a pore volume distribution as a function of the size of the pores such that the ratio $V_{(d5-d50)}/V_{(d5-d100)}$ of at least 0.66.

18. The pneumatic tire of claim 1, wherein the silica has a pore distribution width 1 dp of greater than 0.70, and a size distribution width $L_d$ ((d84−d16)/d50) of objects measured by XDC particle size analysis after ultrasonic disintegration of at least 0.91.

19. The pneumatic tire of claim 1, wherein the silica has a size distribution width $L'_d$ ((d84−d16)/d50) of objects smaller than 500 nm, measured by XDC particle size analysis after ultrasonic disintegration, of at least 0.95; and a pore volume distribution as a function of the size of the pores such that the ratio $V_{(d5-d50)}/V_{(d5-d100)}$ of at least 0.71.

20. The pneumatic tire of claim 1, wherein the silica has a size distribution width $L_d$ ((d84−d16)/d50) of objects smaller than 500 nm, measured by XDC particle size analysis after ultrasonic disintegration, of at least 0.90; and a pore volume distribution as a function of the size of the pores such that the ratio $V_{(d5-d50)}/V_{(d5-d100)}$ is at least 0.74.

* * * * *